United States Patent Office 2,758,277
Patented Aug. 7, 1956

2,758,277

LINEAR PHASE DETECTOR

John I. Daspit, Los Angeles, Calif., assignor to Gilfillan Bros., Inc., Los Angeles, Calif., a corporation of California Application May 4, 1953, Serial No. 352,941

8 Claims. (Cl. 324—85)

The present invention relates to means and techniques for determining or computing the phase displacement of two cyclically varying quantities, such as sine waves, and producing or deriving an electrical quantity which serves as a measure of the phase displacement, such electrical quantity in this instance being a continuous voltage which may be positive or negative, depending upon whether the phase displacement is leading or lagging and with the intensity of such voltage serving as an indication of the degree or magnitude of the phase displacement.

Briefly stated, the present invention involves circuitry to which a sine reference voltage is applied as well as a sine wave whose phase with respect to said reference voltage is to be compared. Each of the two sine waves are shaped to produce square waves, the fundamental frequency of such square waves being a fractional part of the fundamental frequency of the sine waves. In this case, as specifically shown, the fundamental frequency of the square waves is one half of the fundamental frequency of the sine waves. The square waves derived from the sine waves are combined and different algebraic sums are applied to different channels, one channel corresponding to a leading phase and a second channel corresponding to a lagging phase. Each of these two channels is simultaneously controlled in accordance with a voltage which has a negative or positive polarity, depending upon whether there is a leading or lagging phase. The output of each of such channels is applied to a corresponding integrating network, each of such integrating networks controlling a cathode follower. The voltage developed on each cathode follower is applied through a corresponding rectifier to a corresponding condenser, such condensers being interconnected and applied to a common output terminal for developing continuous voltage on such terminal, the polarity of such voltage serving as an indication of either a lagging or leading phase, as the case may be, and the magnitude of such voltage serving as an indication of the magnitude of the phase displacement.

It is, therefore, a general object of this invention to provide improved means and techniques whereby the above indicated results may be obtained.

Another object of the present invention is to provide a phase detector of this character in which there is produced a linear relationship between, on the one hand, phase displacement between two sine waves, and, on the other hand, some convenient analog, for example, a continuous voltage difference.

Another object of the present invention is to provide an arrangement, as indicated in the previous paragraph, wherein the phase angle analog is a continuous voltage, the polarity of which represents the algebraic sign of the phase angle, i. e., leading or lagging.

Another object of the present invention is to provide improved means and techniques for representing the phase displacement between two sine waves, or any similar cyclically varying quantity, with the phase displacement in the range of 0 to 360 degrees, being produced in terms of a continuous voltage which varies linearly and with the change in polarity.

Another specific object of the present invention is to provide improved means and techniques, in view of the teachings herein, to produce a continuous voltage which changes linearly without changing polarity in accordance with phase displacements ranging from 0 to 360 degrees, or 720 degrees, or multiples thereof, depending upon whether the aforementioned square waves are halved in frequency, quartered in frequency, eighthed in frequency, etc.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 1:
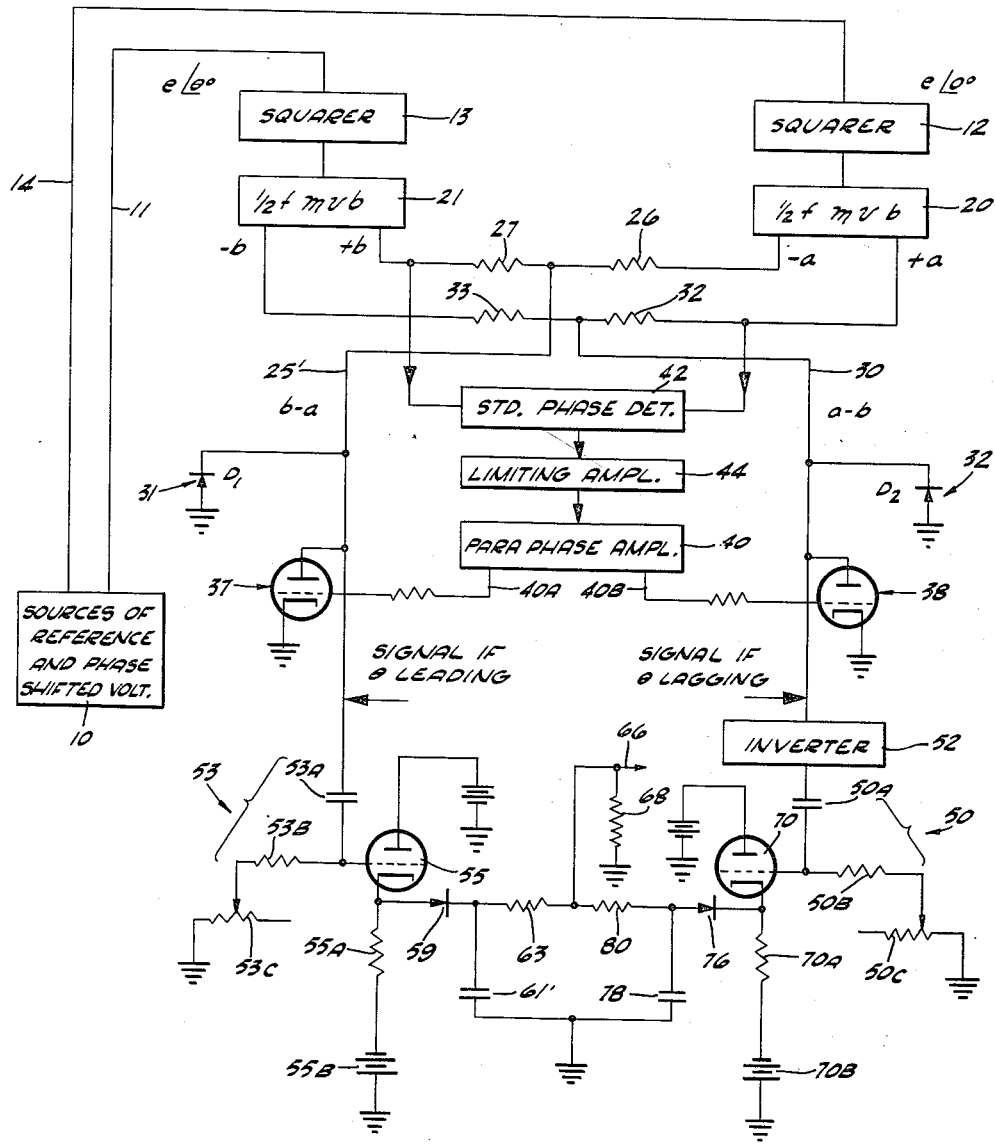
Figure 1 represents in schematic form apparatus embodying features of the present invention.

Referring to Figure 1, the input to the circuitry shown therein comprises a pair of sine waves or similarly cyclically varying quantities. A so-called sine reference voltage of zero phase is applied from the source 10 over lead 14 to a squarer network 12. Likewise, a sine voltage whose phase, with respect to the aforementioned reference voltage, is to be determined is applied over lead 11 to a like squarer network 13. The voltage applied to the network 12 is represented by the sine wave 16 in Figure 2; likewise, the sine wave applied to the network 13 is represented by the sine wave 17 in Figure 2. The squarer networks 12 and 13 serve to shape the sine waves 16 and 17, respectively, into corresponding square waves 18 and 19 which have the same periodicity as the sine waves from which they are derived, such square waves 18 and 19 being applied to corresponding multivibrators 20 and 21. The multivibrators 20 and 21 produce square waves, represented by the so-called plus $a$ wave 24 and the so-called plus $b$ wave 25 in Figure 2. It is noted that the multivibrators 20 and 21 serve to halve cyclical frequency variation. In other words, the phase difference between these square waves 24 and 25 in relationship to the corresponding sine waves 16 and 17, expressed in degrees of the square wave fundamental frequency, is one-half the phase difference existing between the sinusoids 16 and 17. One of the important teachings herein is that the multivibrators 20, 21 serve to fractionalize the cyclical variation and even though the apparatus described herein is concerned with a fraction of one-half, such fraction may likewise be one-third, one-fourth, one-fifth, etc., depending upon the range of phase displacement to be represented by a voltage without change in polarity of such voltage. The general purpose of such fractionalization, produced by the multivibrators 21 and 22, is to provide operation of a larger range of phase difference between voltages 16 and 17, without ambiguity otherwise resulting from change in the polarity of the voltage developed across the output resistance 68, it being noted that the waves 16 and 17 undergo change in polarity every 180°, and by thus dividing the frequency by a factor of two, the voltage across resistance 68 changes its polarity over a corresponding range of 360°.

Figure 2:
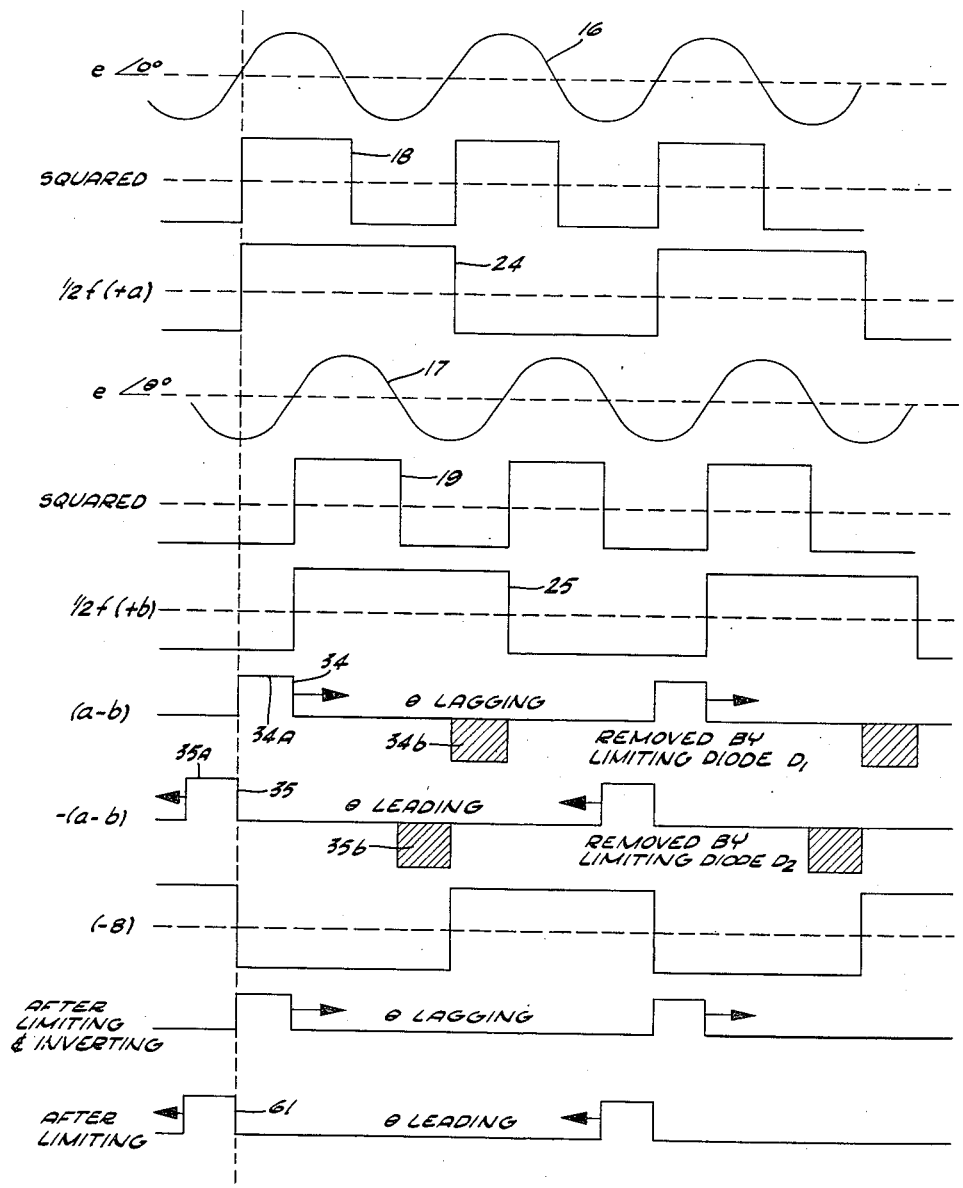
Figure 2 represents a series of wave forms existing under very different conditions in the circuitry illustrated in Figure 1.

Each of the two multivibrator stages 20 and 21 has two outputs, the stage 20 having the outputs plus $a$ and minus $a$, and the stage 21 having the outputs plus $b$ and minus $b$. It is understood that the circuitry described above, on the one hand, handling the wave form 16 and on the other hand, the wave form 17 are similar and, since as shown in Figure 2, such wave forms 16 and 17 have substantially the same amplitude means is disclosed whereby the amplitudes of wave forms a and b are equal, or substantially equal. The minus a voltage is applied to the so-called "leading" channel 25' through resistance 26; and likewise, the plus b wave is applied through resistance 27 to the same channel 25' with the result that channel 25' has applied thereto a voltage represented by b minus a. Likewise, the so-called lagging channel 30 has applied thereto a plus a voltage through resistance 32, and also has applied thereto a minus b voltage through resistance 33 with the result that the channel 30 has applied thereto a voltage represented by a minus b. The a minus b voltage is represented by the wave form 34 in Figure 2 which has a positive portion 34A and a negative portion 34B. It is obvious that the trailing edge of the positive portion 34A is variable depending upon the magnitude of the phase of the lagging voltage. When there is zero lag, the trailing edge of 34A corresponds to the leading edge and, as a matter of fact, there is in such special case no positive or negative portions of the wave 34. It is noted that the wave form 34 is obtained by subtracting the wave form 25 from the wave form 24.

Likewise, instead of there being a lagging condition, as illustrated by the sine waves 16 and 17 in Figure 2, the condition represented by the wave form 35 may exist when the voltage 17 leads the reference voltage 16. This wave form 35 contains positive portions 35A and negative portions 35B, the leading edge of the portion 35A being variably positioned in time in accordance with the magnitude of the leading phase condition; and, as a matter of fact, the leading edge corresponds with the trailing edge when the phase difference between the two voltages 16 and 17 is zero, in which case actually there is no positive or negative portions 35A or 35B. Thus, wave form 34 is considered to be applied to the lagging channel 30 and the wave form 35 (when a leading condition exists) is considered to be applied to the leading channel 25'.

Each of the channels 25' and 30 is returned to ground through corresponding diodes 31 and 32, each having their positive terminals grounded so that the corresponding negative portions 35B and 34B of the waves 35 and 34 are effectively removed and have no influence on the circuitry later described; and this condition is represented by the shading of the negative pulses 34B and 35B in Figure 2. The shading indicates that these pulses are removed. Also, the outputs derived from the channels 25' and 30 are controlled by corresponding grid controlled triodes 37 and 38, each of which has its cathode grounded and its anode connected to corresponding channels or leads 25' and 30. The control grids of the tubes 37 and 38 are controlled simultaneously by the so-called push-pull output of the so-called paraphase or push-pull amplifier 40. The amplifier 40, in turn, is controlled by a voltage of substantially constant intensity but of variable phase depending upon the relative phase of the plus a and plus b waves. For this purpose, the plus a and plus b waves are applied to a phase detector 42 which serves to produce an output voltage having either a positive or negative polarity depending upon whether the plus a wave leads or lags the plus b wave. This voltage derived from the detector 42 is applied to the amplitude limiting amplifier 44, the output of which is coupled to the paraphase amplifier 40. It is understood that when the output terminal 40A of the amplifier 40 is caused to be positive by the voltage applied thereto from the amplifier 44, the other output terminal 40B is negative. In other words, the output of the amplifier 40 controls the two limiters 37 and 38 in such a manner that, when the phase is lagging, the b minus a wave form is suppressed altogether and only the positive portion 34A of the a minus b wave 34 has its effect on the measuring circuit described later. Likewise, when there is a leading phase condition, the output of the amplifier 40 controls the two limiters 37 and 38 in such a manner that the a minus b wave is suppressed altogether and only the positive half 35A of the b minus a wave form is allowed to pass to a different corresponding measuring circuitry since the output of the amplifier stage 40 comprises two voltages 180° out of phase, as described above, for application to the grids of tubes 37 and 38, two subtractions are involved, as described above, one subtraction being for obtaining a voltage b—a and the other subtraction being for obtaining a voltage a—b, which are applied respectively, to the anodes of devices 37 and 38. By these techniques a balanced system capable of good practical adjustment is provided in which the output voltage appearing across the resistance 68 is either positive or negative depending upon whether there is a lagging or a leading phase condition.

The so-called duration measuring circuitry 50 for channel 30 comprises the condenser 50A, fixed resistance 50B and adjustable resistance 50C. An inverter 52 serves to invert the positive portion 34A of the wave form 34 before the same is applied to the condenser 50A. The corresponding duration measuring circuitry 53 for channel 25' includes the condenser 53A, resistance 53B and adjustable resistance 53C. The wave form applied to the condenser 53A (or condenser 50A when the phase is lagging) is indicated by the wave 61 in Figure 2. The peak to peak amplitude is standardized and constant and the time constant of the circuitry 53A, 53B and 53C is several times the period of the wave 24, so that the peak positive deviation of grid potential, measured from the no signal bias value, is proportional to the duration of the positive part of the rectangular wave form 61. Thus, the peak positive grid swing of the cathode follower tube 55 is proportional to the amount of phase lead. The bias on the grid of tube 55 is so adjusted that the cathode of the tube 55 is substantially zero with reference to the ground in the absence of a signal voltage applied to the control grid of the tube. The positive voltage developed on the cathode of tube 55 is applied through the diode rectifier 59 to the condenser 61', it being noted that one terminal of the condenser 61' is grounded and the other one of its terminals is connected through resistance 63 to the output terminal 66 which is returned to ground through the load output resistance 68.

Assuming a lagging phase condition, a signal is applied to the control grid of the cathode follower tube 70, with a peak negative grid deviation from the bias value proportional to the phase lag. The diode 76 is so poled that a negative voltage is developed on the condenser 78 having one of its terminals grounded and the other one of its terminals connected through resistance 80 to the aforementioned terminal 66. Thus, a negative potential appears across condenser 78 proportional to the phase lag, and similarly positive voltage appears across condenser 61 proportional to the phase lead.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. In an arrangement of the character described, a first source of a first voltage, a second source of a second voltage which has generally the same shape and the same periodicity as said first voltage, first wave shaping means coupled to said first source and functioning to produce a first substantially square wave of lower periodicity than the periodicity of said first voltage, second wave shaping means coupled to said second source and producing a second substantially square wave having a periodicity less than the periodicity of said second voltage, a first channel representing a phase leading condition, a second channel representing a phase lagging condition, means coupled to said first and second wave shaping means producing a voltage which is representative of the difference between said first and said second square waves and applying the same to said first channel, means coupled to said first and second wave shaping means producing a voltage which is the difference between said second and first square waves and applying said difference to said second channel, means coupled to said first and second source and controlling said first and second channels simultaneously to render the same alternatively effective in accordance with the phase difference between said first and second square waves, condenser means coupled to said first channel for producing a substantially continuous voltage representative of the difference voltage applied to said first and second channels, condenser means coupled to said second channel and producing a substantially continuous voltage which is the measure of the difference voltage applied to said second channel, said first and second condenser means being coupled to a common impedance.

2. A first source of a first square wave, a second source of a second square wave which has the same periodicity as said first wave, a first channel representing a phase leading condition, a second channel representing a phase lagging condition, means coupled to said first and second sources producing a first difference voltage which is representative of the amplitude difference between said first square wave and said second square wave and applying the same to said first channel, means coupled to said first and second sources and producing a voltage which is the difference between said second and first square waves and applying said difference to said second channel, means coupled to said first and second source and controlling said first and second channels simultaneously to render the same alternatively effective in accordance with the phase difference between said first and second square waves, condenser means coupled to said first channel for producing a substantially continuous voltage representative of said first difference voltage applied to said first and second channels, condenser means coupled to said second channel and producing a substantially continuous voltage which is the measure of said second difference voltage applied to said second channel, said first and second condenser means being coupled to a common impedance.

3. In an arrangement of the character described, a first source of a first voltage, a second source of a second voltage which has generally the same shape and the same periodicity as said first voltage, a first channel representing a leading condition, a second channel representing a lagging condition, means coupled to said first and second source for deriving a voltage which is a first difference in amplitude between said first voltage and said second voltage and applying said difference voltage to said first channel, means coupled to said first and second source and deriving a second difference voltage which is the difference in amplitude between said second voltage and said first voltage, and applying said second difference voltage to said second channel, phase responsive means coupled to said first and second sources and controlling said first and second channels simultaneously to render the same alternatively effective, and means coupled to said first and second channels for deriving a continuous voltage which is representative of either said first difference voltage or said second difference voltage, as the case may be, depending upon which of said first and second channels is rendered effective.

4. In an arrangement of the character described, a first source of a first voltage, a second source of a second voltage which has generally the same shape and the same periodicity as said first voltage, a first channel representing a leading condition, a second channel representing a lagging condition, means coupled to said first and second source for deriving a voltage which is a first difference in amplitude between said first voltage and said second voltage and applying said difference voltage to said first channel, means coupled to said first and second source and deriving a second difference voltage which is the difference in amplitude between said second voltage and said first voltage, and applying said second difference voltage to said second channel, phase responsive means coupled to said first and second sources and controlling said first and second channels simultaneously in accordance with the phase differences between said first and second voltages to render said first and second channels alternatively effective, and an output circuit coupled to both said first and second channels for developing a voltage which is representative of either said first difference voltage or said second difference voltage as the case may be depending upon which of said first and second channels is rendered effective.

5. In an arrangement of the character described, a first source of a first voltage, a second source of a second voltage which has generally the same shape and the same periodicity as said first voltage, a first channel representing a leading condition, a second channel representing a lagging condition, means coupled to said first and second source for deriving a voltage which is a first difference in amplitude between said first voltage and said second voltage and applying said difference voltage to said first channel, means coupled to said first and second source and deriving a second difference voltage which is the difference in amplitude between said second voltage and said first voltage, and applying said second difference voltage to said second channel, means connected to each of said first and second channels to remove voltage variations therefrom of predetermined polarity, phase sensitive means coupled to said first and second sources and controlling said first and second channels jointly to render the same alternatively effective in accordance with the phase difference between said first and second voltages and an output circuit coupled to both first and second channels for developing a voltage which is representative of either said first difference voltage or said second difference voltage as the case may be, depending upon which of said first and second channels is rendered effective.

6. In an arrangement of the character described, a first source of a first voltage, a second source of a second voltage which has generally the same shape and the same periodicity as said first voltage, a first channel representing a leading condition, a second channel representing a lagging condition, means coupled to said first and second source for deriving a voltage which is a first difference between said first voltage and said second voltage and applying said difference voltage to said first channel, means coupled to said first and second source and deriving a second difference voltage which is the difference between said second voltage and said first voltage, and applying said second difference voltage to said second channel, phase responsive means coupled to said first and second sources and controlling said first and second channels simultaneously to render the same alternatively effective, means coupled to said first and second channels for deriving a continuous voltage which is representative of either said first difference voltage or said second difference voltage as the case may be, depending upon which of said first and second channels is rendered effective, and means connected to said first channel and to said second channel to remove voltage variations of predetermined polarity therefrom.

7. In an arrangement of the character described, a first source of a first voltage, a second source of a second voltage which has generally the same shape and the same periodicity as said first voltage, a first channel representing a phase leading condition, a second channel representing a phase lagging condition, means coupled between said first source, said second source and first channel for applying to said first channel, a first difference voltage which is the difference in amplitude between said first voltage and said second voltage, means coupled between said first source, said second source, and said second channel for applying a second difference in amplitude between said second voltage and said first voltage, phase sensitive means coupled to said first source and said second source for developing a pair of voltages, each of which is representative of the phase between said first voltage and said second voltage, and applying each of said pair of voltages to a corresponding one of said first and second channels for rendering said first and second channels alternatively effective, and an integrating network coupled to a corresponding one of said first and second channels for deriving a voltage representative of which is representative of either said first difference voltage or said second difference voltage, as the case may be, depending upon which of said first and second channels is rendered effective.

8. In an arrangement of the character described, a first source of a first cyclically varying voltage, a second source of a second cyclically varying voltage which has generally the same shape and the same periodicity as said first voltage, a first channel representing a leading condition, a second channel representing a lagging condition, means coupled to said first and second source for deriving a voltage which is the difference between said first voltage and said second voltage and applying said difference voltage to said first channel, the last mentioned means including means for reducing the periodicity of said first difference voltage, means coupled to said first and second source and deriving a second difference voltage which is the difference between said second voltage and said first voltage and applying said second difference voltage to said second channel, the last mentioned means including means for reducing the periodicity of said second difference voltage, phase responsive means coupled to said first and second sources and controlling said first and second channels simultaneously to render the same alternatively effective, means coupled to said first and second channels for deriving a continuous voltage which is representative of either said first difference voltage or said second difference voltage as the case may be, depending upon which of said first and second channels is rendered effective.

References Cited in the file of this patent

UNITED STATES PATENTS

| | | |
|---|---|---|
| 2,287,174 | Heising | June 23, 1942 |
| 2,472,507 | Andresen | June 7, 1949 |

OTHER REFERENCES

Abstract of application Serial No. 605,128, published on August 23, 1949.